United States Patent [19]

Kagei

[11] Patent Number: 5,137,344
[45] Date of Patent: Aug. 11, 1992

[54] SEMI-FINISHED LENS

[75] Inventor: Kazunori Kagei, Fukui, Japan

[73] Assignee: Kabushiki Kaisha Asahi Optical, Fukui, Japan

[21] Appl. No.: 651,838

[22] Filed: Feb. 7, 1991

[51] Int. Cl.$^5$ .......................... G02C 7/02; B29D 11/00
[52] U.S. Cl. .................. 351/177; 51/284 R; 264/2.7
[58] Field of Search ............ 351/159, 167, 177; 264/2.7; 51/284 R, 284 E

[56] References Cited

U.S. PATENT DOCUMENTS

| | | | |
|---|---|---|---|
| 3,960,442 | 6/1976 | Davis et al. | 351/159 X |
| 4,289,387 | 9/1981 | Jalie | 351/159 |
| 4,561,736 | 12/1985 | Fürter | 351/159 |

Primary Examiner—Scott J. Sugarman
Attorney, Agent, or Firm—Jordan and Hamburg

[57] ABSTRACT

A semi-finished lens of plastic material which will be ground on the basis of a spectacles prescription to be completed as a myopia correcting single-focus lens is molded such that the convex surface is a spherical non-processed surface and the concave surface is a non-spherical molded surface which requires no grinding. Thus, a completed lens can be easily obtained by simply grinding the spherical convex surface. Further, the concave surface which is a nonspherical molded surface is formed as an ellipsoidal surface of revolution, hyperboloidal surface of revolution or other nonspherical surface which has a curvature providing spherical power or a combination of spherical power and astigmatic power and whose curvature decreases from the optical center toward the periphery, whereby the difficulty of grinding can be decreased and the completed lens is free from the warping of images due to spherical aberration and has an edge which is thin and makes a better appearance.

1 Claim, 1 Drawing Sheet

SEMI-FINISHED LENS

BACKGROUND ART

1. Technical Field

The present invention relates to a semi-finished lens of plastic material which will be later completed by grinding on the basis of a spectacles prescription.

2. Technical Background

Plastic lenses having a usual range of power degrees are produced by the cast-molding process, and prescribed lenses produced on the basis of spectacles prescriptions, particularly those lenses which are powerful and which have both spherical power and astigmatic power, are produced mostly from prefabricated semi-finished lenses by grinding on the basis of spectacles prescriptions.

As for grinding operation of such semi-finished lenses, grinding both surfaces on the basis of a spectacles prescription is less efficient than preparing one surface as a molded lens surface which needs no grinding and the other surface as a nonprocessed surface and grinding the latter on the basis of a prescription.

In the prior art, as shown in FIG. 3, a semi-finished lens L1' of plastic material is produced, with its concave surface 11 molded using a mold having a first surface of a given curvature so that the lens L1' has a spherical nonprocessed surface b' corresponding to the first surface of the mold, and with its convex surface 12 molded using a mold having a second surface of a given curvature and ground with high precision so that the lens L1' has a spherical molded surface a' which corresponds to the second surface of the mold and which needs no grinding. Thus, when a spectacles prescription is determined for a customer, the nonprocessed concave surface 11 is ground on the basis of said prescription and, the prescribed lens L2' desired by the customer as shown in FIG. 4 is thus provided.

However, to finish said conventional type of semi-finished lens to provide a prescribed lens, the concave surface 11 has to be ground. Further, this concave surface is spherical; therefore, if a lens having a complicated curved surface, for example, a toric lens for astigmatism is to be ground, a variety of complicated jigs are required and so this is a very complicated technique. Therefore, there have been drawbacks that a lens processed with high precision cannot be obtained and that too much time is required for processing.

Among single-focus lenses of plastic material, prescribed lenses completed by grinding semi-finished lenses are chiefly those having special degrees of power outside the range of those for lenses usually produced by lens makers and include considerably powerful lenses having high degrees of spherical power and astigmatic power. Therefore, a lens completed by grinding the concave surface 11, as described above, has a relatively large edge thickness B, a fact which is not desirable from the standpoint of use and appearance.

Further, in conventional toric lenses having spherical power and astigmatic power, since one surface is a toric surface and the other is a spherical or flat surface, lenses produced by grinding have the drawback of having spherical aberration, and since they are powerful as described above, this problem of spherical aberration becomes more serious.

OBJECTS OF THE INVENTION

Accordingly, an object of the invention is to provide a semi-finished lens of plastic material which can be easily ground without requiring complicated jigs after a spectacles prescription has been determined for a customer. Another object is to provide a semi-finished lens which can be easily completed on the basis of a prescription for a customer to provide a completed lens which causes no warping of images due to spherical aberration and whose edge is thin and makes a better appearance. Yet another object of the invention is to provide a method of making a finished myopia correcting single focus lens of plastic material.

SUMMARY OF THE INVENTION

The present invention which solves the aforesaid problems is a semi-finished lens of plastic material used for myopia correcting single-focus lenses, characterized in that it is molded such that the convex surface is a spherical nonprocessed surface and the concave surface is a nonspherical molded lens surface which needs no processing and a method of making a finished myopia correcting single focus lens of plastic material which includes molding the aforementioned semi-finished lens.

When this semi-finished lens is ground on the basis of a spectacles prescription, it is only necessary that the convex surface which is a nonprocessed surface be spherically ground, which grinding operation is easier than the conventional operation of grinding a concave surface and requires no complicated jigs or complicated technique, the grinding accuracy attained being high. Therefore, an optical nonspherical lens of high precision can be obtained simply by grinding the spherical convex surface on the basis of a prescription.

Further, the semi-finished lens can be made such that the concave surface which is a molded surface is formed as an ellipsoidal surface of revolution, hyperboloidal surface of revolution or other nonspherical surface which has a curvature providing spherical power or a combination of spherical power and astigmatic power and whose curvature decreases from the optical center toward the periphery.

When it is desired to process this semi-finished lens to provide, e.g., an astigmatism correcting lens, this can be attained by simply grinding the convex surface, not requiring grinding to provide a curvature associated with astigmatic power. As a result, the difficulty of processing in grinding operation is decreased, the yield is increased and the processing time is shortened. Further, it is possible to obtain a lens which is free from spherical aberration. And the edge thickness of the lens is decreased, so that the lens is lighter in weight and makes a better appearance.

DESCRIPTION OF THE PREFERRED EMBODIMENTS

Figure 1:
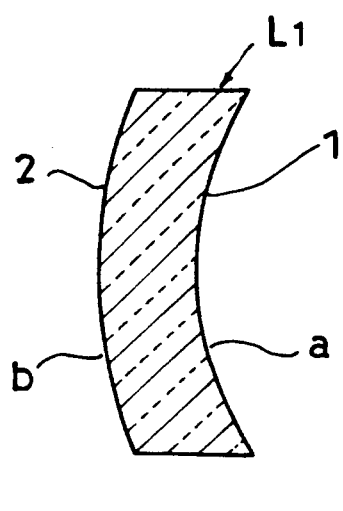
FIG. 1 is a sectional view of a semi-finished lens according to a first embodiment of the present invention.

FIG. 1 shows a semi-finished lens L1 of plastic material according to the present invention, having a given thickness. The concave surface 1 is molded using a mold having an accurately produced first surface of a given nonspherical shape and curvature to form a molded lens surface a of nonspherical shape corresponding to the first surface of the mold and having a degree of precision which makes grinding unnecessary. The convex surface 2 is molded using a mold having a spherical surface of a given curvature to form a spherical nonprocessed molded lens surface b corresponding to the second surface of the mold. That is, this convex surface 2 will be ground to become a completed lens surface. The thickness of this semi-finished lens L1 is set at a value necessary for grinding the lens to provide a completed lens.

The concave surface 1 forming the molded lens surface a is usually formed as an ellipsoidal surface of revolution, hyperboloidal surface of revolution or other nonspherical surface which has a curvature providing a given spherical power or a combination of spherical power and astigmatic power and whose curvature gradually decreases from the optical center toward the periphery (its radius of curvature increases).

With the semi-finished lens L1 of the present invention arranged in the manner described above, when it is desired to grind this semi-finished lens L1 on the basis of a spectacles prescription, this can be attained by grinding the convex surface 2, which is the aforementioned spherical nonprocessed surface b, to provide a spherical shape of predetermined curvature based on the prescription, with the concave surface 1, which is the molded lens surface a requiring no grinding, used as a base. Therefore, this grinding is simpler than grinding a conventional concave surface and does not require any complicated jig or complicated technique, and the required grinding accuracy is easy to attain.

Since the concave surface 1 which requires no grinding is formed on the molded lens surface a of nonspherical shape having a curvature associated with spherical power or a curvature associated with a combination of spherical power and astigmatic power, even when it is desired to grind an astigmatic correcting lens, there is no need to perform a grinding operation for astigmatic power on the convex surface 2. Thus, a lens L2 which has a predetermined astigmatic power and which is free from spherical aberration can be obtained by grinding the convex surface into a spherical form having a predetermined curvature.

Figure 2:
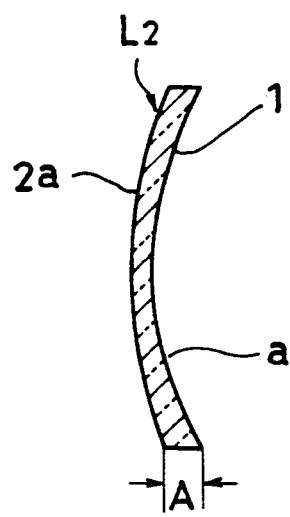
FIG. 2 is a sectional view of a completed lens obtained by grinding said semi-finished lens.
Figure 3:
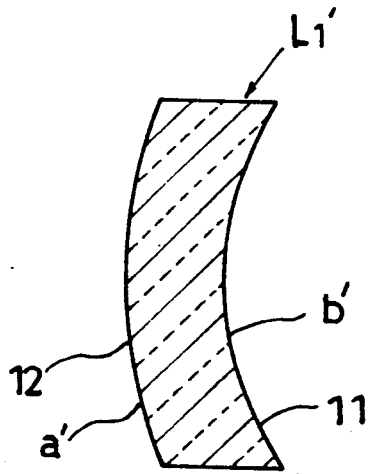
FIG. 3 is a sectional view of a conventional semi-finished lens.

FIG. 2 shows the completed lens L2 having a lens surface 2a completed by grinding the spherical nonprocessed convex surface 2 to provide a given curvature by using the present inventive semi-finished lens of FIG. 1.

Figure 4:
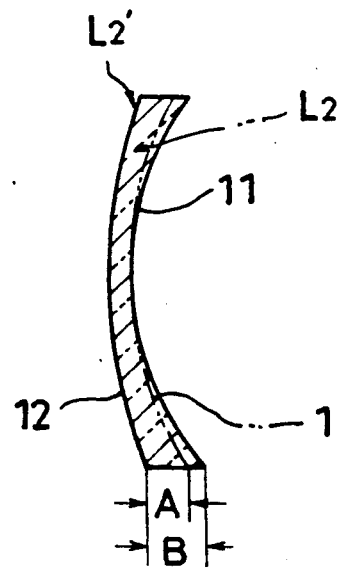
FIG. 4 is a sectional view of a completed lens obtained by grinding the conventional semi-finished lens.

When the completed lens L2 obtained by grinding the semi-finished lens L1 of the present invention is compared with the completed lens L2' of FIG. 4 obtained by grinding the conventional semi-finished lens L1', it is seen, as shown in FIG. 4, that the edge thickness A of the lens L2 obtained by grinding the semi-finished lens L1 is less than the edge thickness B obtained by grinding the conventional semi-finished lens.

That is, in the present invention, since the concave surface 1 which is nonspherical is in the form of an ellipsoidal surface of revolution, hyperboloidal surface of revolution or other nonspherical surface having a smaller curvature at its periphery than at its optical center and having its curvature gradually decreased (the radius of curvature is gradually increased), the grinding of the convex surface 2 which is the nonprocessed surface b into a spherical form results in the edge thickness of the peripheral portion being less in the case of the concave surface 1 being nonarcuate in cross section than in the case of a lens having a concave surface such that the curvature at the center is the same as that at the periphery.

Particularly, as considered from the object of efficiently providing a completed lens according to a prescription by grinding only one surface of a semi-finished lens, the production of a lens by using a mold having an accurate nonspherical surface of a given curvature to make the a concave molded lens surface which requires no grinding while grinding the convex surface into a spherical form, as in the case of the semi-finished lens of the present invention, is more advantageous than the production of such lens by grinding the concave surface, as in the case of a conventional semi-finished lens, from the standpoint of a method of grinding plastic lenses.

Therefore, the semi-finished lens of the present invention can be easily ground on the basis of a prescription for a customer, and causes no warping of images due to spherical aberration, and the edge is thin and makes a better appearance.

What is claimed is:

1. A method of making a finished myopia correcting single focus lens of plastic material comprising molding a semi-finished lens such that it has a spherical convex surface and a nonspherical concave surface opposite the spherical convex surface, said nonspherical concave surface being formed as an ellipsoidal surface of revolution, hyperboloidal surface of revolution or other nonspherical surface which has a curvature providing spherical power or a combination or spherical power and astigmatic power and whose curvature decreases from the optical center toward the periphery, and grinding the convex surface into a spherical form having a curvature determined by a spectacles prescripton.

* * * * *